Figure 1:
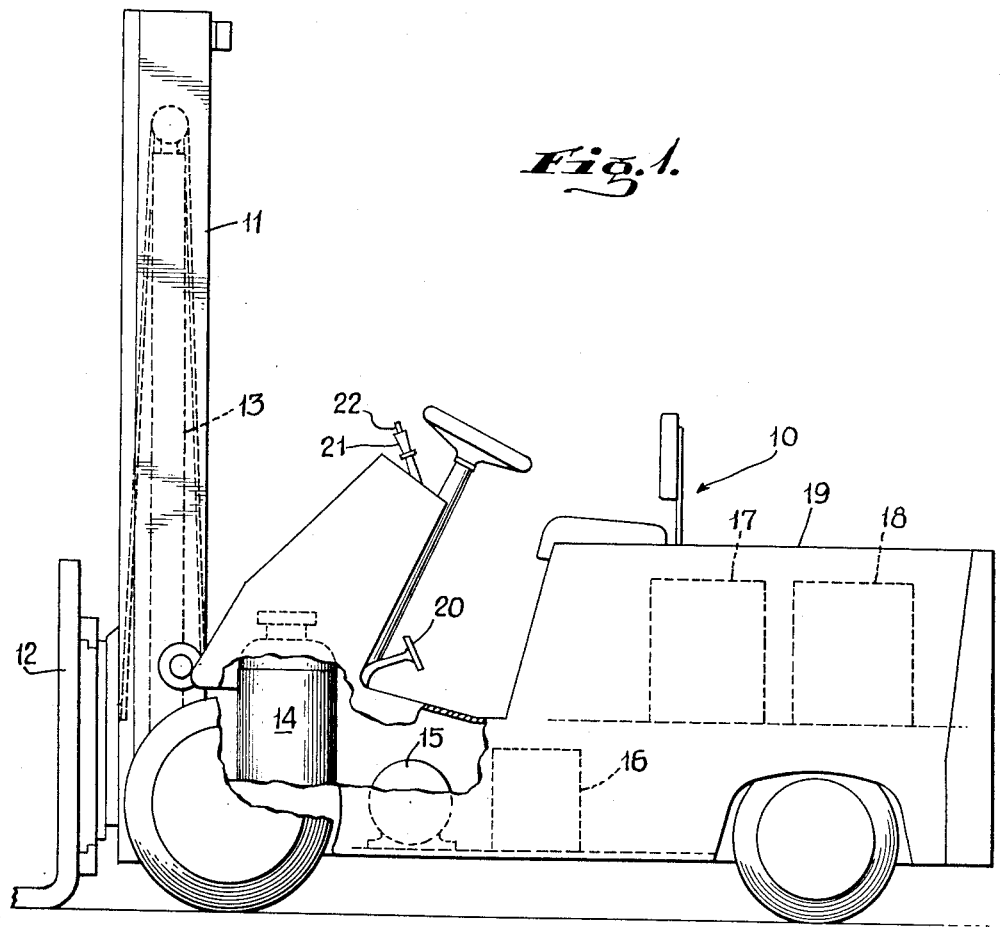

Feb. 2, 1965   G. H. ROGGENKAMP   3,168,688
BATTERY FED PLURAL MOTOR CONTROL SYSTEM FOR AN INDUSTRIAL TRUCK
Filed Dec. 7, 1962   2 Sheets-Sheet 1

INVENTOR.
GEORGE H. ROGGENKAMP
BY
A.H. Golden
ATTORNEY

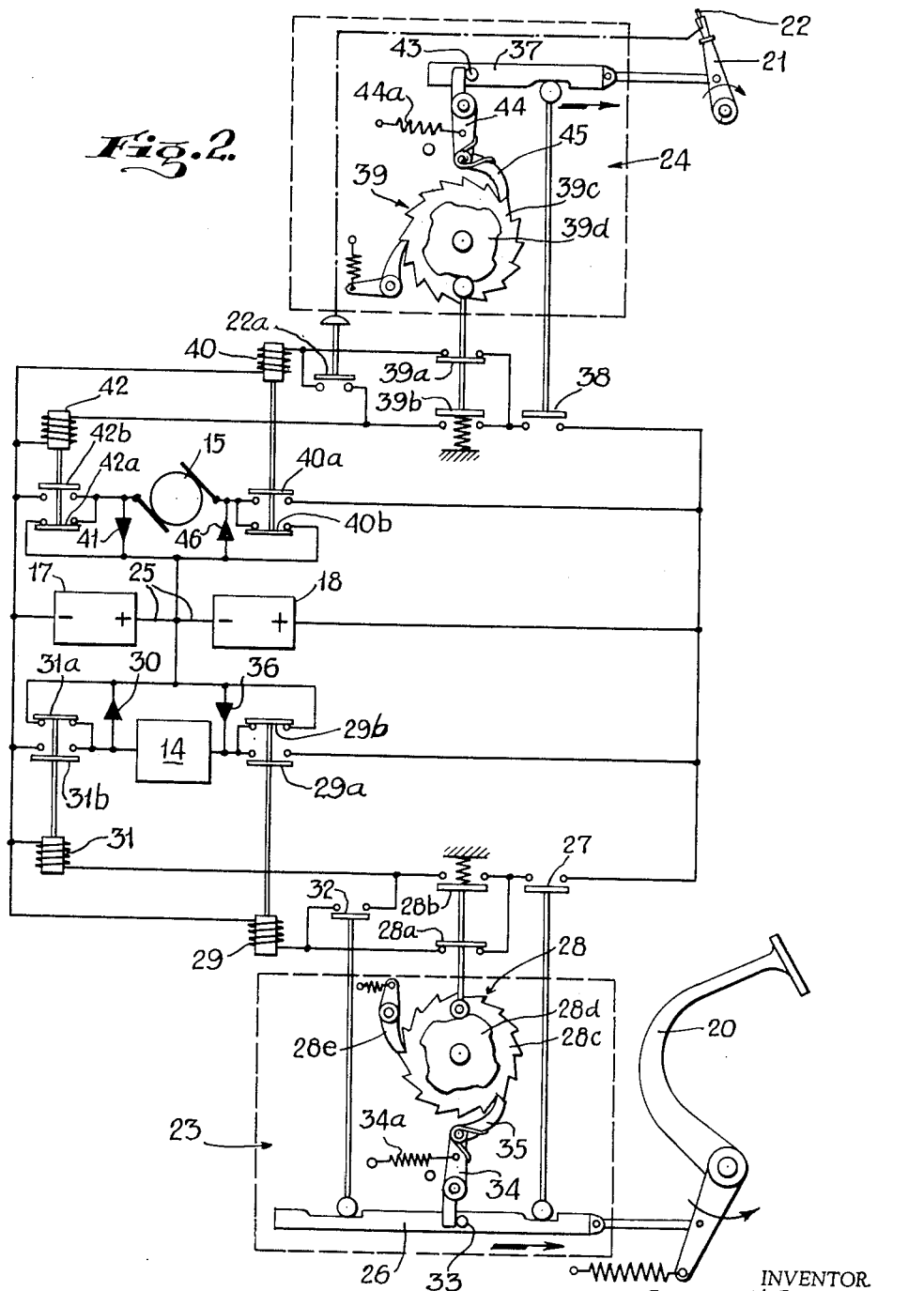

United States Patent Office 3,168,688
Patented Feb. 2, 1965

3,168,688
BATTERY FED PLURAL MOTOR CONTROL SYSTEM FOR AN INDUSTRIAL TRUCK
George H. Roggenkamp, Palos Heights, Ill., assignor, by mesne assignments, to Yale & Towne, Inc., New York, N.Y., a company of Ohio
Filed Dec. 7, 1962, Ser. No. 243,136
6 Claims. (Cl. 318—17)

This invention relates to a motor control system for controlling the speed of a battery operated traction motor and a second electric motor, such as a pump motor, of an industrial truck.

It has heretofore been proposed to control the speed of a traction motor, at least in part, by first connecting two batteries in parallel across the traction motor to give low voltage, slow speed operation of the traction motor, and then connecting the two batteries in series across the traction motor to provide high voltage, high speed operation of the traction motor. Such a control system has been found very satisfactory for many applications, as it is very efficient and provides for substantially equal discharge of the two batteries.

However, with such a control system, it is impossible to operate both a traction motor and a second motor, such as an electric pump motor simultaneously at different voltages from the same two batteries. This is due to the fact that when the traction motor is being operated at low voltage, the two batteries are connected in parallel and only low voltage is available at this time for operating the second motor. This poses a problem in some industrial trucks wherein it is desirable to operate an electric pump motor at high speed to provide high speed operation of a hydraulic lift ram, while at the same time operate the truck at low speed. It is necessary, therefore, when using such a control system in such a truck, to either provide a second source of voltage for operating the pump motor at high speed while the truck is moving slowly, or to provide two pump motors to provide the necessary volume of flow of hydraulic fluid to provide the high speed operation of the lift ram.

This invention provides an improved control system in which both the second motor and the traction motor may be operated at different voltages simultaneously from the same two batteries, and which at the same time, prevents substantial unequal discharge of the two batteries.

This is accomplished in accordance with the invention by providing a series connection between the two batteries so that the double voltage of the two batteries is available at all times for operation of both the second motor and the traction motor. The speed of either motor is controlled independently by first connecting only one battery across the particular motor to provide low voltage, low speed operation of the motor, and thereafter connecting the second battery in series with the first across the motor to provide double voltage for high speed operation. Substantial unequal discharge of the batteries is effectively prevented by a novel arrangement wherein first one battery and then the other battery is used for slow speed operation of the motors on successive operations of the motors.

As a feature of the invention, means are provided whereby the second battery may be connected in series with the first battery across either motor without disconnecting the first battery, thereby eliminating arcing at the contacts of the switches and providing smoother change in speed of the motors.

The invention and its advantages having been broadly described, a more detailed description of one embodiment of the invention is given hereafter by reference to the accompanying drawings, wherein:

FIG. 1 is a side elevational view of an electrically operated lift truck of the type on which the control system of the invention may be advantageously used for controlling the electric traction motor and electric pump motor of the truck; and FIG. 2 is a wiring diagram of a control system constructed in accordance with the invention for controlling the traction motor and the electric pump motor of the truck shown in FIG. 1.

Referring to the drawings and in particular to FIG. 1, the lift truck 10 illustrated is of conventional construction and includes vertically extending uprights 11, a load carriage 12 mounted for vertical movement on the uprights, and a vertically extending hydraulic ram 13 for elevating the load carriage 12.

The truck 10 is moved through operation of an electric traction motor 14, and fluid under pressure is supplied to the hydraulic ram 13 to elevate the load carriage through operation of an electric pump motor 15 which drives a suitable pump. A fluid reservoir 16 is provided adjacent the pump motor 15 from which the pump draws fluid for operating the ram 13.

Two batteries 17 and 18, mounted in a suitable housing 19 on the rear of the truck, supply the electric power for operating the traction motor 14 and the pump motor 15. The speed of the traction motor 14 is controlled through movement of an accelerator pedal 20 on the floor of the operator's compartment, and the pump motor 15 is controlled through movement of a lever 21 mounted on the instrument panel adjacent the steering wheel. Lever 21 has a switch 22 mounted thereon which may be actuated to provide high speed operation of the pump motor 15 when high speed lifting is desired.

It will be appreciated that with a truck of this type, it is often desirable to operate the pump motor 15 at high speed to provide rapid lifting of a load supported on the load carriage 12, while the truck is being moved slowly by the traction motor 14. This invention provides a novel control system whereby the traction motor 14 and the pump motor 15 may be simultaneously operated at different voltages from the same two batteries 17 and 18 to provide the desired difference in speed between the two motors.

In FIG. 2, there is shown a simple wiring diagram of a control system constructed in accordance with the invention for operating the traction motor 14 and the pump motor 15 from the two batteries 17 and 18. In the diagram, the controller for the traction motor 14 is generally designated at 23. The controller 23 is operated by pressing the accelerator pedal 20. The controller for operating the pump motor 15 is generally indicated at 24, and is operated by movement of the lever 21.

For simplicity, the controller 23 is shown as having two speed positions, one in which the traction motor 14 is connected across only one of the batteries 17 or 18, and another in which the traction motor is connected across both batteries in series. It will be appreciated, however, that additional switches may be provided which are actuated by movement of the controller to provide additional speed steps by varying the connection of the field windings of the traction motor and by adding or removing resistors from the traction motor circuit.

In the diagram, the various switches are shown in a position in which neither the traction motor 14, nor the pump motor 15 is being operated. In this position of the switches, the two batteries 17 and 18 are connected in series by a line 25. As will be described in detail hereafter, this series connection between the batteries 17 and 18 may be maintained at all times.

To initiate operation of the traction motor 14, the operator of the truck presses down on the accelerator pedal 20 to effect movement of a cam rod 26 of the controller 23 to the right, as viewed in FIG. 2. Initial movement of the cam rod 26 to the right closes contacts 27, thereby completing a circuit through closed contacts 28a of a ratchet switch 28 to energize the solenoid of a relay switch 29. Energizing relay 29 causes normally open contacts 29a thereof to close and normally closed contacts 29b to open. Closing of contacts 29a completes a circuit from the positive to the negative side of battery 18 through the traction motor 14, through a uni-directional conductor 30, and also through a parallel or shunt circuit around the uni-directional conductor 30 formed by normally closed contacts 31a of a relay switch 31, so that the battery 18 is connected across traction motor 14 to provide low voltage, low speed operation of the traction motor 14.

The parallel or shunt circuit, around the uni-directional conductor 30, formed by the closed contacts 31a allows the uni-directional conductor 30 to be of low current rating, as a considerable portion of the current is carried through the parallel or shunt circuit.

As the accelerator pedal 20 is further depressed by the operator to move the cam rod 26 further to the right, contacts 32 are closed, while contacts 27 continue to be held closed. Closing of contacts 32 completes a circuit through the closed contacts 27 and closed contacts 28a of the ratchet switch 28 to energize the solenoid of relay switch 31. Energizing relay 31 causes normally closed contacts 31a thereof to open and normally open contacts 31b to close. Closing contacts 31b completes a circuit from the positive side of battery 18 to the negative side of battery 17, through previously closed contacts 29a of relay switch 29 and the traction motor 14, so that both batteries 17 and 18 are connected in series across the traction motor 14 to provide double voltage and high speed operation of the traction motor 14.

When the operator releases the accelerator pedal 20, the cam rod 26 is moved to the left, first allowing contacts 32 to open and then allowing contacts 27 to open to disconnect one battery and then the other battery from the motor 14. During final movement of the cam rod 26 to the left, a pin 33 on the cam rod 26 contacts an end of a pivotally mounted pawl supporting lever 34, causing the lever to be rotated in a clockwise direction. This clockwise rotation of the lever 34 causes a pawl 35, on the end of the lever, to rotate a ratchet 28c and a cam 28d of the ratchet switch 28 in a counterclockwise direction, whereby contacts 28b are closed and contacts 28a are opened by the cam 28d.

Thus, the next time that the accelerator pedal 20 is depressed, the solenoid of relay switch 31 is first energized by the closing of contacts 27, so that contacts 31b of relay 31 are closed and normally closed contacts 31a are opened. Closing contacts 31b completes a circuit from the positive side to the negative side of battery 17 through a uni-directional conductor 36, and also through a parallel or shunt circuit around uni-directional conductor 36 formed by closed contacts 29b of relay 29, and through the traction motor 14, whereby the battery 17 is now connected across the traction motor 14 to provide low voltage, low speed operation of the motor 14.

As the cam shaft 26 is moved to the right on depressing of the accelerator pedal 20, the pawl supporting lever 34 is rotated in a counterclockwise direction by a spring 34a, while the ratchet 28c and cam 28d are held against rotation by a holding pawl 28e, so that the pawl 35 is positioned to again rotate the ratchet 28c and cam 28d when the accelerator pedal 20 is again released. Thus, on each successive operation of the accelerator pedal 20, a different battery is used in the slow speed operation of the traction motor 14, and objectionable unequal discharge of the batteries 17 and 18 is prevented.

The uni-directional conductors 30 and 36 prevent short circuiting of the batteries 17 and 18 when the contacts 31b of relay 31 are closed or the contacts 29a of relay 29 are closed to connect the second battery in series with the first battery, across the traction motor 14 to provide high speed operation of the motor. Thus, uni-directional conductor 30 prevents battery 17 from being short circuited when contacts 31b are closed and contacts 31a opened, and uni-directional conductor 36 prevents short circuiting of battery 18 when contacts 29a are closed and contacts 29b opened. The opening of the contacts 29b and 31a breaks the parallel or shunt circuits around the uni-directional conductors 30 and 36 so that the uni-directional conductors are effective to prevent such short circuiting at this time. In the absence of the uni-directional conductors, the batteries would have to be completely disconnected from the motor circuit, then reconnected in series, and then reconnected into the motor circuit, with resulting arcing of the contacts and jump or lurch of the tractor motor 14.

The controller 24 operates in a somewhat similar manner to control the speed of the pump motor 15. Thus, to operate the pump motor 15, the operator pulls the lever 21 to rotate the lever in a clockwise direction and move a cam rod 37 to the right, as viewed in FIG. 2. Movement of the cam rod 37 to the right causes contacts 38 to close.

Closing of contacts 38 completes a circuit through closed contacts 39a of a ratchet switch 39 to energize a solenoid of a relay switch 40. Energizing relay 40 causes normally open contacts 40a to close and normally closed contacts 40b to open. Closing of contacts 40a completes a circuit from the positive to the negative side of the battery 18 through the motor 15, through a uni-directional conductor 41, and also through a parallel or shunt circuit around the uni-directional conductor 41 formed by closed contacts 42a of a relay switch 42, whereby battery 18 is connected across the motor 15, to provide low voltage, low speed operation of the motor 15.

If high speed operation of the pump motor 15 is desired to provide rapid lifting of the load, the operator presses the switch 22 on the lever 21 causing contacts 22a to close. Closing of contacts 22a completes a circuit through previously closed contacts 38 and closed contacts 39a of the ratchet switch 39 to energize the solenoid of relay switch 42, causing normally closed contacts 42b to open and normally open contacts 42a to close. Closing of contacts 42a completes a circuit from the positive side of battery 18 to the negative side of battery 17 through the previously closed contacts 40a, and the motor 15, whereby both batteries 17 and 18 are connected in series across the pump motor 15 to provide double voltage and high speed operation of the pump motor 15.

High speed operation of the pump motor 15 may be stopped by releasing the switch 22 to open the contacts 22a, and slow speed operation of the pump motor stopped by again moving the lever 21 in the counterclockwise direction to move the cam rod 37 to the left, allowing contacts 38 to open. During final movement of the cam rod 37 to the left, a pin 43 on the cam rod 37 engages the end of a pawl supporting lever 44, rotating the lever 44 in a counterclockwise direction to cause a pawl 45 on the outer end of the lever to rotate a ratchet 39c and cam 39d of the ratchet 39 in the clockwise direction to open contacts 39a and close contacts 39b. The pawl 45 is repositioned relatively to the ratchet 39c by a spring 44a each time that the lever 21 is operated in the clockwise direction.

Thus, on the next operation of the lever 21, the battery 17 is used instead of battery 18 in the low speed operation of the motor 15. When the lever 21 is again rotated in the clockwise direction to move the cam rod 37 to the right and close contacts 38, a circuit is completed through now closed contacts 39b to energize the solenoid of relay 42, thereby closing contacts 42b and opening contacts 42a. Closing contacts 42b completes a circuit from the positive side to the negative side of the battery 17 through a uni-directional conductor 46 and the pump motor 15, and also through a parallel or shunt circuit around the uni-directional conductor 46 formed by closed contacts 40b, whereby the battery 17 is used for low speed operation of the pump motor 15.

The parallel or shunt circuits formed by contacts 42a of the relay switch 42 and the contacts 40b of the relay switch 40 allow uni-directional conductors of low current capacity to be used, as the parallel circuits take a major portion of the circuit. The uni-directional conductors 41 and 46 prevent short circuiting of the batteries 17 and 18 as both batteries are connected in series across the pump motor 15. At this time, the parallel or shunt circuits are opened by the opening of contacts 40b and 42a, so that the uni-directional conductors are effective to prevent such short circuiting of the batteries.

It will be noted that by the arrangement described, the pump motor 15 may be connected across both batteries 17 and 18 to provide double voltage and high speed operation of the motor 15, while at the same time the traction motor 14 is connected only across one of the batteries 17 and 18, to provide low speed operation of the traction motor 14. It will also be noted that on each successive operation of either the lever 21 or the accelerator pedal 20, first one battery and then the other battery is used in the low speed operation of the motors. In this manner, objectionable unequal discharge of the batteries is prevented.

While one embodiment of the invention has been shown and described, it will be appreciated that this is for the purpose of illustration and that changes and modifications may be made therein without departing from the spirit and scope of the invention.

I now claim:

1. An industrial truck comprising,
an electric traction motor for driving said truck,
two batteries connected in series and mounted on said truck for supplying electric power to said electric traction motor,
movable controller means,
means operative by initial movement of said controller means in one direction to connect one of said batteries across said traction motor and on a successive operation of said controller means to connect the other of said batteries across said traction motor while the two batteries remain connected in series, whereby a different battery is used for low voltage, low speed operation of the traction motor on successive operations of said controller means to prevent substantial unequal discharge of said batteries and at the same time the sum of the voltages of the two batteries is available for operation of other electrically operated means on said truck when only one battery is connected across the traction motor, and
means operative by continued further movement of said controller means in said one direction to connect both batteries in series across said traction motor to provide high voltage, high speed operation of said traction motor.

2. An industrial truck comprising,
an electric traction motor for driving said truck,
a second electric motor on said truck,
two batteries connected in series and mounted on said truck for supplying electric power to said electric traction motor,
movable controller means,
means operative by initial movement of said controller means in one direction to connect one of said batteries across said traction motor and on a successive operation of said controller means to connect the other of said batteries across said traction motor while the two batteries remain connected in series, whereby a different battery is used for low voltage, low speed operation of the traction motor on successive operations of said controller means to prevent substantial unequal discharge of said batteries and at the same time the sum of the voltages of the two batteries is available for high speed operation of said second electric motor,
means operative by continued further movement of said controller means in said one direction to connect both batteries in series across said traction motor to provide high voltage, high speed operation of said traction motor,
second movable controller means, and
means operative by movement of said controller means to connect one of said batteries across said second motor and on a successive operation of said controller means to connect the other of said batteries across said second motor while the two batteries remain connected in series whereby a different battery is used for low voltage, low speed operation of said second motor on successive operations of said controller means to prevent substantial unequal discharge of said batteries and at the same time the sum of the voltages of the two batteries is available for high speed operation of said traction motor.

3. An industrial truck comprising,
an electric traction motor for driving said truck,
two batteries connected in series and mounted on said truck for supplying electric power to said electric traction motor,
separate means for each battery operable to independently connect each battery across said traction motor while the two batteries are connected in series so that the sum of the voltages of the two batteries is available for operation of other electrically operated means on said truck,
movable controller means,
means operative by initial movement of said controller means in one direction to operate one of said separate means to connect one of said batteries across said traction motor to provide low voltage, low speed operation of said traction motor,
means operative by continued further movement of said controller means in said one direction to operate both said separate means whereby both batteries are connected in series across said traction motor to provide high voltage, high speed operation of said traction motor, and
means whereby on successive operations of said controller means a different one of said separate means is operated by initial movement of said controller means so that a different one of said batteries is used for low voltage, low speed operation of said traction motor on successive operations of said traction motor, to thereby prevent unequal discharge of the batteries.

4. An industrial truck comprising,
an electric traction motor for driving said truck,
two batteries conected in series and mounted on said truck for supplying electric power to said electric traction motor,
a separate uni-directional conductor connected across each battery with the polarity thereof opposite that of the battery to prevent short circuiting of the battery,
separate means for each battery operable to independently connect each battery across said traction motor through the uni-directional conductor of the other battery while the two batteries are connected in series so that the sum of the voltages of the two batteries is available for operation of other electrically operated means on said truck,
movable controller means,
means operative by initial movement of said controller means in one direction to operate one of said separate means to connect one of said batteries across said traction motor through the uni-directional conductor across the other battery to provide low voltage, low speed operation of said traction motor while the other battery is connected in series with the one battery, means operative by continued further movement of said controller means in said one direction to operate both said separate means whereby both batteries are connected in series across said traction motor to provide high voltage, high speed operation of said traction motor, said uni-directional conductor across said other battery preventing short circuiting of said other battery during connection of said other battery in series with said one battery across said traction motor, and means whereby on successive operations of said controller means a different one of said separate means is operated by initial movement of said controller means so that a different one of said batteries is used for low voltage, low speed operation of said traction motor on successive operations of said traction motor, to thereby prevent unequal discharge of the batteries.

5. An industrial truck comprising, an electric traction motor for driving said truck, two batteries connected in series and mounted on said truck for supplying electric power to said electric traction motor, a separate uni-directional conductor connected across each battery with the polarity thereof opposite that of the battery to prevent short circuiting of the battery, separate means for each battery operable to independently connect each battery across said traction motor through the uni-directional conductor of the other battery while the two batteries are connected in series so that the sum of the voltages of the two batteries is available for operation of other electrically operated means on said truck, movable controller means, means operative by initial movement of said controller means in one direction to operate one of said separate means to connect one of said batteries across said traction motor through the uni-directional conductor across the other battery to provide low voltage, low speed operation of asid traction motor while the other battery is connected in series with the one battery, means operative by continued further movement of said controller means in said one direction to operate both said separate means whereby both batteries are connected in series across said traction motor to provide high voltage, high speed operation of said traction motor, said uni-directional conductor across said other battery preventing short circuiting of said other battery during connection of said other battery in series with said one battery across said traction motor, and means whereby on alternate operations of said controller means a different one of said separate means is operated by initial movement of said controller means so that a different one of said batteries is used for low voltage, low speed operation of said traction motor on successive operations of said traction motor to thereby prevent unequal discharge of the batteries.

6. An industrial truck comprising, an electric traction motor for driving said truck, two batteries connected in series and mounted on said truck for supplying electric power to said electric traction motor, a separate uni-directional conductor connected across each battery with the polarity thereof opposite that of the battery to prevent short circuiing of the battery, a shunt circuit across each of said uni-directional conductors, separate means for each battery operable to independently connect each battery across said traction motor through the uni-directional conductor of the other battery and the shunt circuit of the other battery, while the two batteries are connected in series so that the sum of the voltages of the two batteries is available for operation of other electrically operated means on said truck, movable controller means, means operative by initial movement of said controller means in one direction to operate one of said separate means to connect one of said batteries across said traction motor through the uni-directional conductors and shunt circuit across the other battery to provide low voltage, low speed operation of said traction motor, while the other battery is connected in series with the one battery, and to open the shunt circuit across the uni-directional conductor of the one battery, means operative by continued further movement of said controller means in said one direction to operate both said separate means whereby both batteries are connected in series across said traction motor to provide high voltage, high speed operation of said traction motor, and to open the shunt circuits across the uni-directional conductors of said batteries, said uni-directional conductor across said other battery preventing short circuiting of said other battery during connection of said other battery in series with said one battery across said traction motor, and means whereby on alternate operations of said controller means a different one of said separate means is operated by initial movement of said controller means so that a different one of said batteries is used for low voltage, low speed operation of said traction motor on successive operations of said traction motor, to thereby prevent unequal discharge of the batteries.

References Cited in the file of this patent

UNITED STATES PATENTS

| | | |
|---|---|---|
| 652,124 | Leitner | June 19, 1900 |
| 1,155,170 | Storer | Sept. 28, 1915 |
| 1,364,212 | Sharpe | Jan. 4, 1921 |
| 2,895,057 | Coughlin | July 4, 1959 |
| 2,998,776 | Morgan | Sept. 5, 1961 |
| 3,029,301 | Strider | Apr. 10, 1962 |

FOREIGN PATENTS

| | | |
|---|---|---|
| 119,108 | Australia | Nov. 2, 1944 |
| 481,751 | Great Britain | Mar. 17, 1938 |